United States Patent [19]

Uehara

[11] Patent Number: 5,033,047
[45] Date of Patent: Jul. 16, 1991

[54] MULTIPROCESSOR SYSTEM WITH A FAULT LOCATOR

[75] Inventor: Izushi Uehara, Tokyo, Japan

[73] Assignee: NEC Corporation, Tokyo, Japan

[21] Appl. No.: 355,628

[22] Filed: May 23, 1989

[30] Foreign Application Priority Data

May 23, 1988 [JP] Japan .................................. 63-123865

[51] Int. Cl.$^5$ .............................................. G06F 11/00
[52] U.S. Cl. ...................................... 371/8.2; 371/16.1
[58] Field of Search ................ 371/8.2, 36, 20.1, 16.1, 371/15.1, 49.1, 9.1

[56] References Cited

U.S. PATENT DOCUMENTS

| | | | |
|---|---|---|---|
| 4,181,940 | 1/1980 | Underwood et al. | 371/9.1 |
| 4,200,224 | 4/1980 | Flint | 371/16.1 |
| 4,371,952 | 2/1983 | Schuck | 371/16.1 |
| 4,639,917 | 1/1987 | Furuta | 371/49.1 |
| 4,872,172 | 10/1989 | Sanner | 371/49.1 |
| 4,876,686 | 10/1989 | Sasaki et al. | 371/49.1 |
| 4,918,693 | 4/1990 | Ardini, Jr. et al. | 371/51.1 |

Primary Examiner—Jerry Smith
Assistant Examiner—Phung My Chung
Attorney, Agent, or Firm—Sughrue, Mion, Zinn Macpeak & Seas

[57] ABSTRACT

In a multiprocessor system in which at least three processors are connected to a system bus by way of which data and source and destination processor identification numbers are exchanged between source and destination processors. A third processor receives the same data and the same source and destination processor ID numbers as those received by the destination processor. Each processor detects an error in data being transmitted to the bus and detects an error in data being received therefrom. A transmit error bit is stored into a transmit error bit register in response to the detection of error in the transmitted data and a receive error bit is stored into a receive error bit register in response to the detection of error in the received data. The processor ID numbers are also stored in registers in each processor in response to the detection of the errors. A fault locator is connected to the transmit and receive error bit registers of each processor and to the ID number registers of each processor to analyze the contents of such registers to locate a fault in the system on the basis of a majority decision.

8 Claims, 6 Drawing Sheets

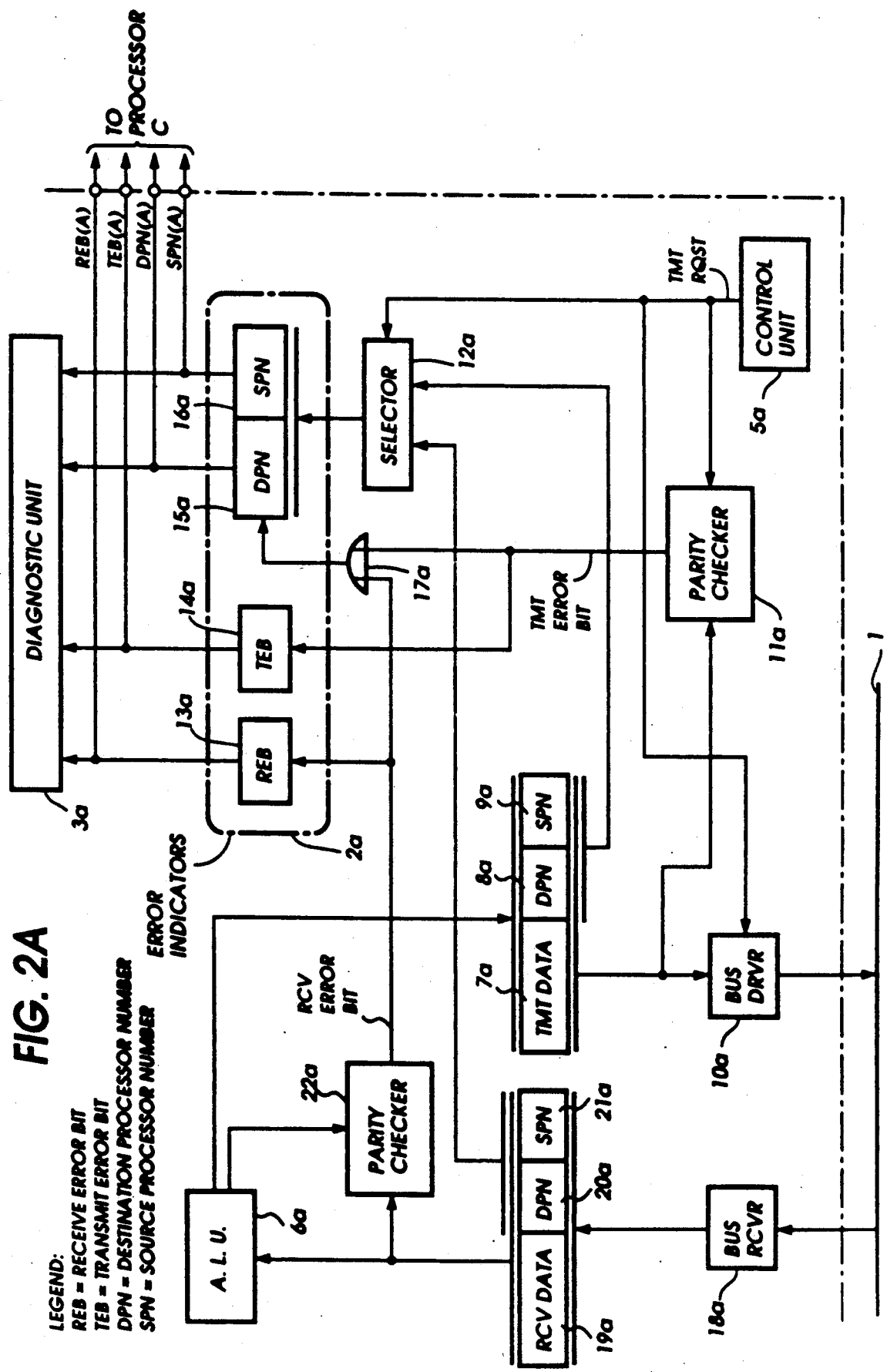

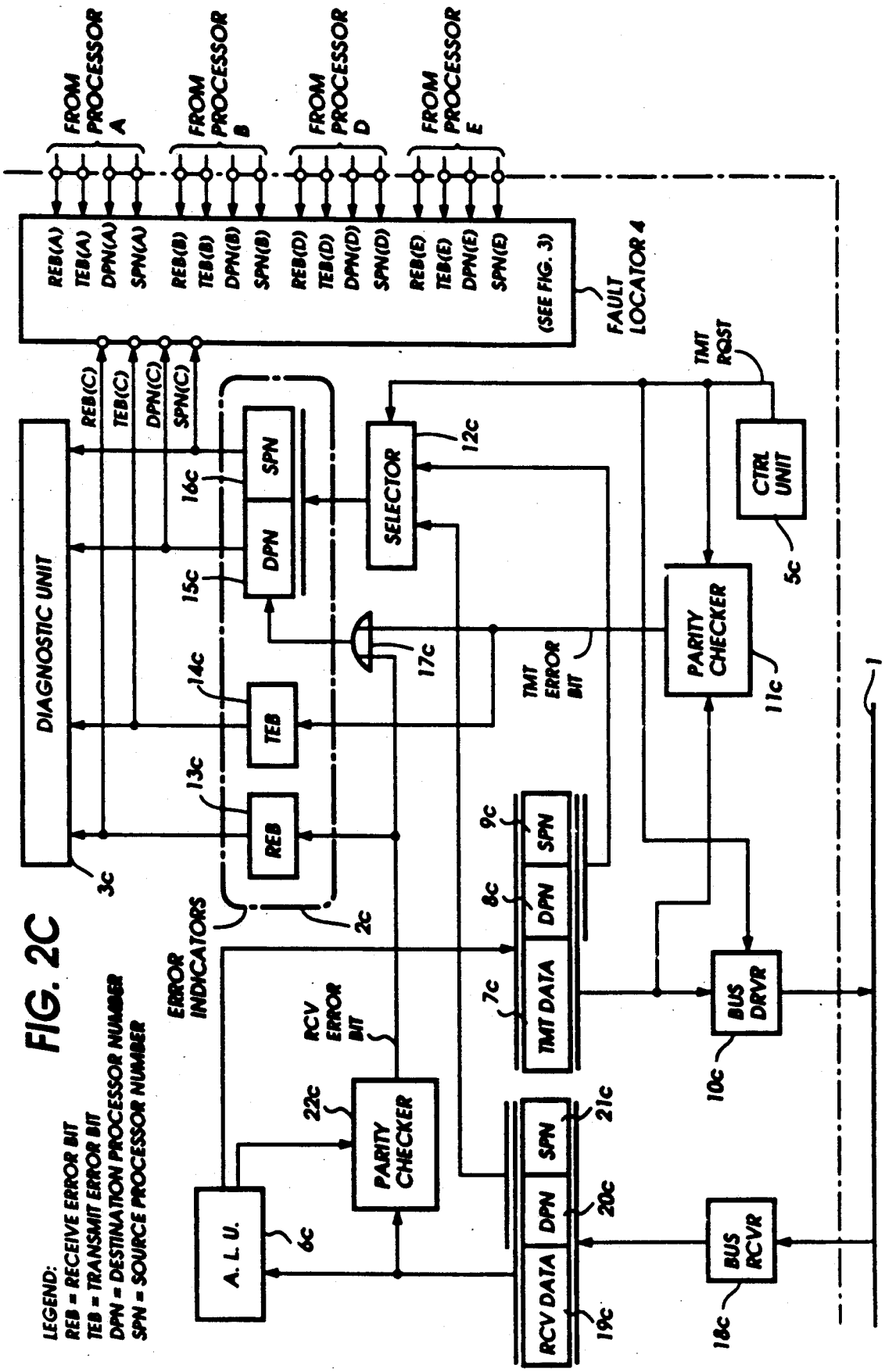

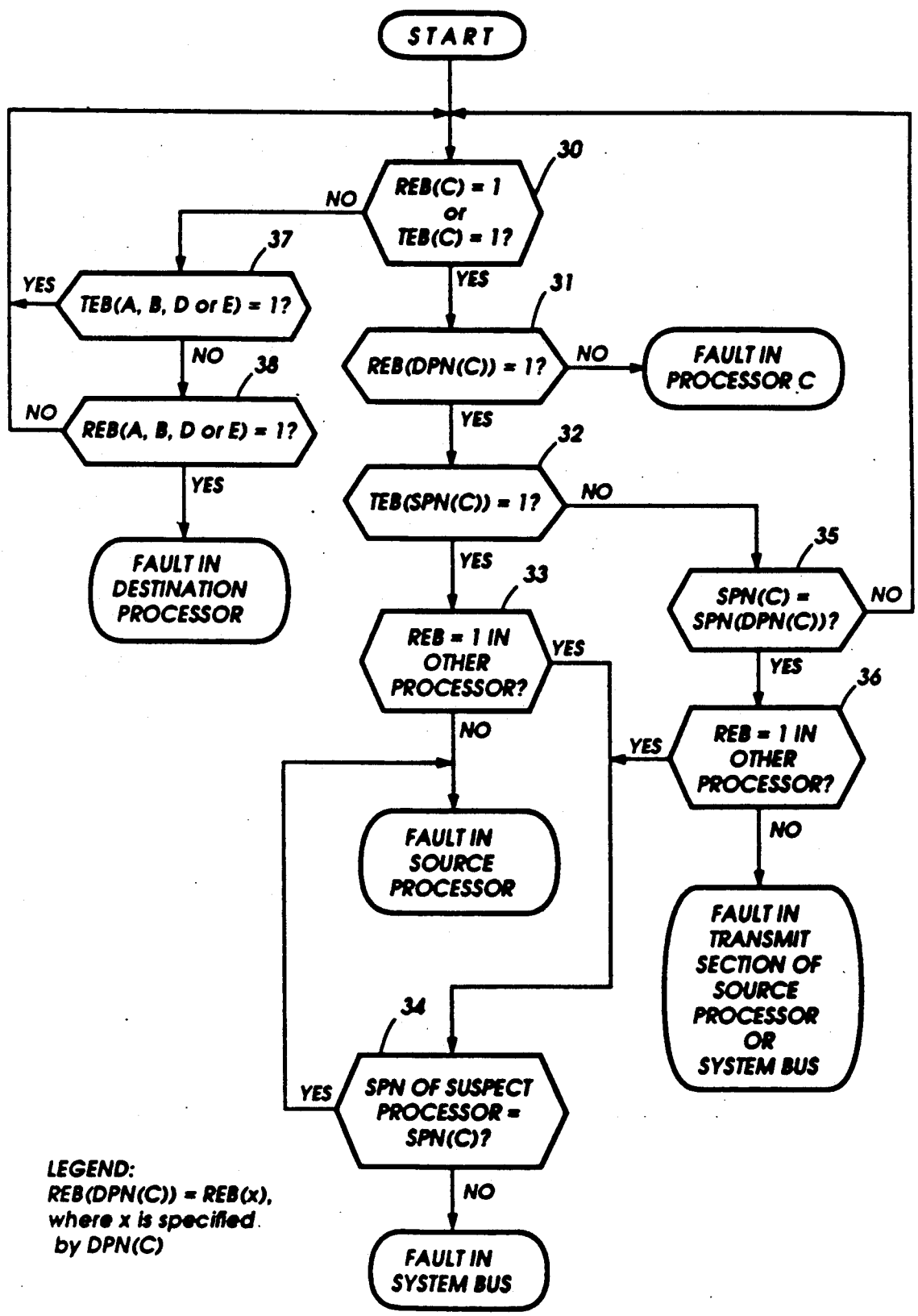

FIG. 4

| | PROCESSOR A | | | | PROCESSOR B | | | | PROCESSOR C | | | |
|---|---|---|---|---|---|---|---|---|---|---|---|---|
| | REB (A) | TEB (A) | DPN (A) | SPN (A) | REB (B) | TEB (B) | DPN (B) | SPN (B) | REB (C) | TEB (C) | DPN (C) | SPN (C) |
| CASE 1 | 0 | 1 | "B" | "A" | 1 | 0 | "B" | "A" | 1 | 0 | "B" | "A" |
| CASE 2 | 0 | 0 | — | — | 1 | 0 | "B" | "A" | 0 | 0 | — | — |
| CASE 3 | 0 | 0 | — | — | 0 | 0 | — | — | 1 | 0 | "B" | "A" |
| CASE 4 | 0 | 0 | — | — | 1 | 0 | "B" | "A" | 1 | 0 | "B" | "A" |

5,033,047

MULTIPROCESSOR SYSTEM WITH A FAULT LOCATOR

BACKGROUND OF THE INVENTION

The present invention relates generally to multiprocessor systems in which multiple processors are connected to a common system bus for exchanging data, and more specifically to fault location in a multi-processor system.

Conventional fault location techniques for multiprocessor systems involve detection of errors by a source processor in an output signal at the entry point of a common system bus and detection of eror by a destination processor in an input signal entering to it from the system bus. However, the current techniques are not capable of identifying the location of a fault if it occurs in such portions of the multiprocessor system such as the bus driver of a source processor, the bus receiver of a destination processor and the system bus. In addition, a single data error caused by a failure in a given point of the system may often be multiplied as the data is handled by a number of processors and detected by such processors at different times. Such multiple detections, however, make it extremely difficult to identify the fault location and eventually cause a system failure.

SUMMARY OF THE INVENTION

It is therefore an object of the present invention to provide a reliable multiprocessor system by enabling the location of faults which are likely to affect the operation of the whole system.

In each processor of the multiprocessor system of the present invention, an error is detected in data being transmitted to a system bus and an error is detected in data being received from the system bus. A transmit error bit and a receive error bit are stored in transmit and receive error bit registers in response to the detection of the error in the data being transmitted and in response to the detection of the error in the data being received. The identification numbers of source and destination processors are stored in source and destination processor number registers in response to the detection of the error in either of the data being transmitted or received. The multiprocessor system comprises a fault locator which is connected to the transmit and receive error bit registers of each processor and further connected to the source and destination processor number registers of each processor. The fault locator analyzes the contents of the transmit and receive error bit registers of each processor and the contents of the source and destination processor number registers of each processor, and locates a fault in the system in accordance with the result of the analysis.

In a specific aspect of the invention, the fault location analysis is made on the contents of the transmit and receive error bit registers of at least three of the processors on the basis of majority decision. Of the three processors, one is a source processor, a second is a destination processor and the third is a processor which also receives the same data and the same source and destination identification numbers as those received by the destination processor.

BRIEF DESCRIPTION OF THE DRAWINGS

The present invention will be described in further detail with reference to the accompanying drawings, in which:

FIGS. 2A, 2B and 2C are block diagrams of the processors A,B and C of FIG. 1, respectively;

FIG. 3 is a flowchart describing a sequence of instructions executed by the fault locator of FIG. 2C; and FIG. 4 is a list of error bits and processor numbers for a number of exemplary cases in which data is transmitted from processor A to processor B.

DETAILED DESCRIPTION

Figure 1:
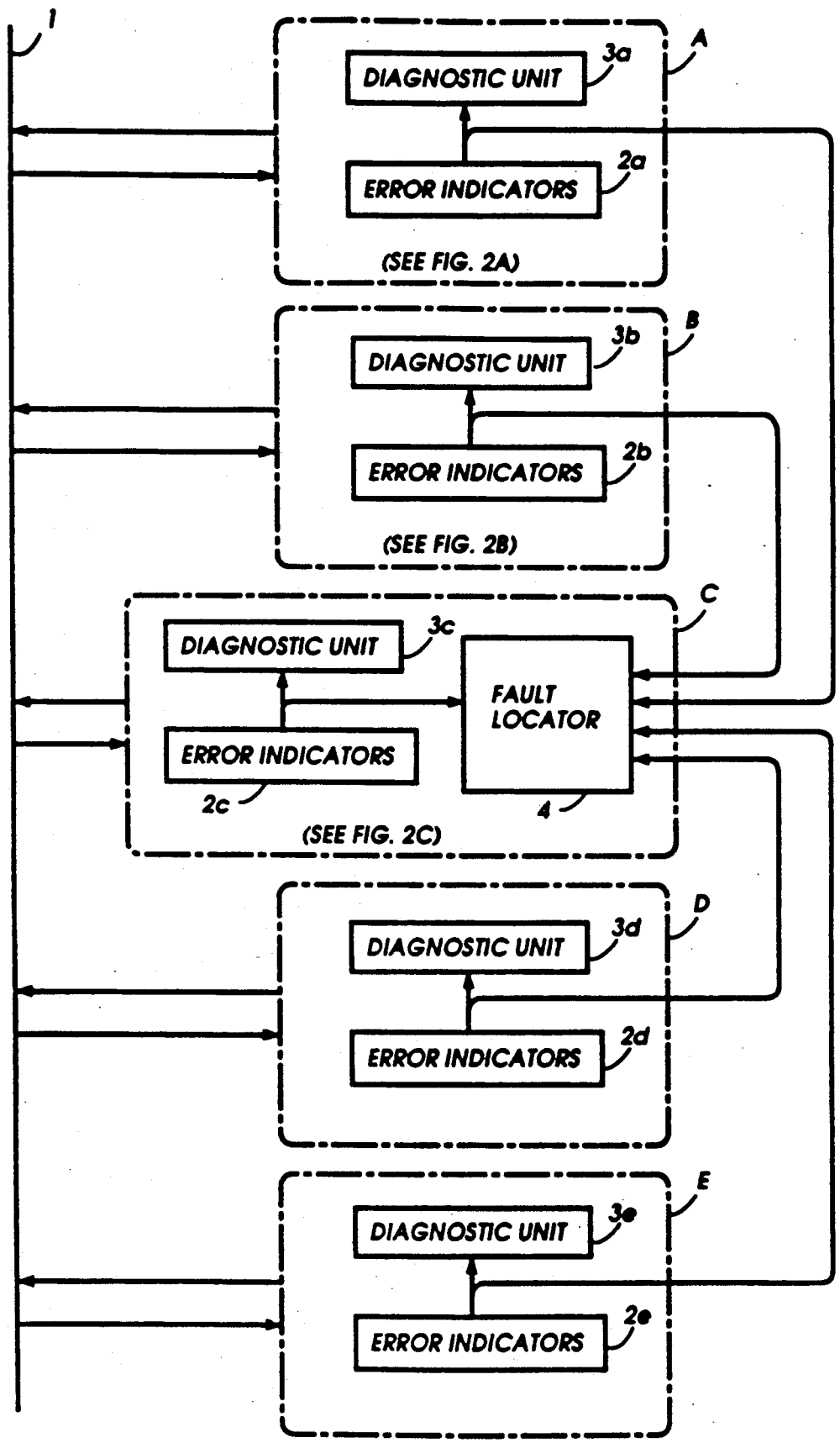
FIG. 1 is a schematic block diagram of a multiprocessor system of the present invention.

Referring now to FIG. 1, there is shown a multiprocessor system embodying the present invention. In the system, processors A,B,C,D and E are connected to a system bus 1 which serves as a common transmission medium to transmit data from a source processor to a destination processor. Processors A,B,D and E are of identical construction and processor C differs therefrom in that it additionally includes a fault locator 4. As representative of various components, each of the processors is provided with an error indicators unit 2 and a diagnostic unit 3 and the fault locator 4 of the processor C receive signals from the error indicators units 2a, 2b, 2d and 2e of the other processors as well as from its own error indicators unit 2c.

The interface section of the processor A is shown in FIG. 2A. Processor A includes a control unit 5a which generates a transmit request signal (logic 1) when processor A sends data to a destination processor. An arithmetic logic unit 6a supplies transmit data to a transmit buffer unit including a transmit data register 7a, a destination processor number (DPN) register 8a and a source processor number (SPN) register 9a for temporary storage of computational data, destination processor number and source processor number. The outputs of the registers 7a, 8a and 9a are connected to a bus driver 10a and a parity checker 11a. The transmit signals stored in the registers 7a, 8a and 9a are forwarded to the system bus 1 when the bus driver 10a is enabled in response to the transmit request signal from the control unit 5a and, at the same time, parity is checked by the parity checker 11a for an error in the transmit data sent from register 7a to the system bus 1. In response to the transmit request signal, a selector 12a receives the destination and source processor numbers from DPN and SPN registers 8a and 9a for coupling to error indication registers 15a and 16a of the error indicators unit 2a, respectively. If an error is detected in the transmit data, a transmit error bit (logic 1) is supplied from the parity checker 11a through an OR gate 17a to the enable terminal of registers 15a and 16a to store the destination processor number (DPN) and source processor number (SPN) respectively therein. The transmit error bit is also supplied to a transmit error bit (TEB) register 14a of the error indicators unit 2a to store a logic 1 therein to indicate that there is an error in the transmit data.

Processor A receives signals from the system bus 1 through a bus receiver 18a by receive buffer unit including a receive data register 19a, a destination processor number (DPN) register 20a, and a source processor number (SPN) register 21a. All data stored in these registers 19a, 20a and 21a are supplied to the arithmetic logic unit 6a to provide computations on the data stored in register 19a and further to a parity checker 22a. Parity checker 22a is enabled in response to a signal from the arithmetic logic unit 6a when the necessary items of data are entered to it. If an error is detected in the data in register 19a, parity checker 22a applies a logic-1 receive error bit to a receive error bit (REB) register 13a as well as to the enable terminal of registers 15a, 16a through OR gate 17a. Under this condition, the transmit request terminal of control unit 5a is a logic 0, and hence the selector 12a passes DPN and SPN data from registers 20a and 21a to the error indicating registers 15a and 16a, respectively.

Registers 13a, 14a, 15a and 16a of the error indicators unit 2a are connected to the diagnostic unit 3a for error analysis as well as to the fault locator 4 of processor C through terminals designated respectively REB(A), TEB(A), DPN(A) and SPN(A).

Figure 2B:
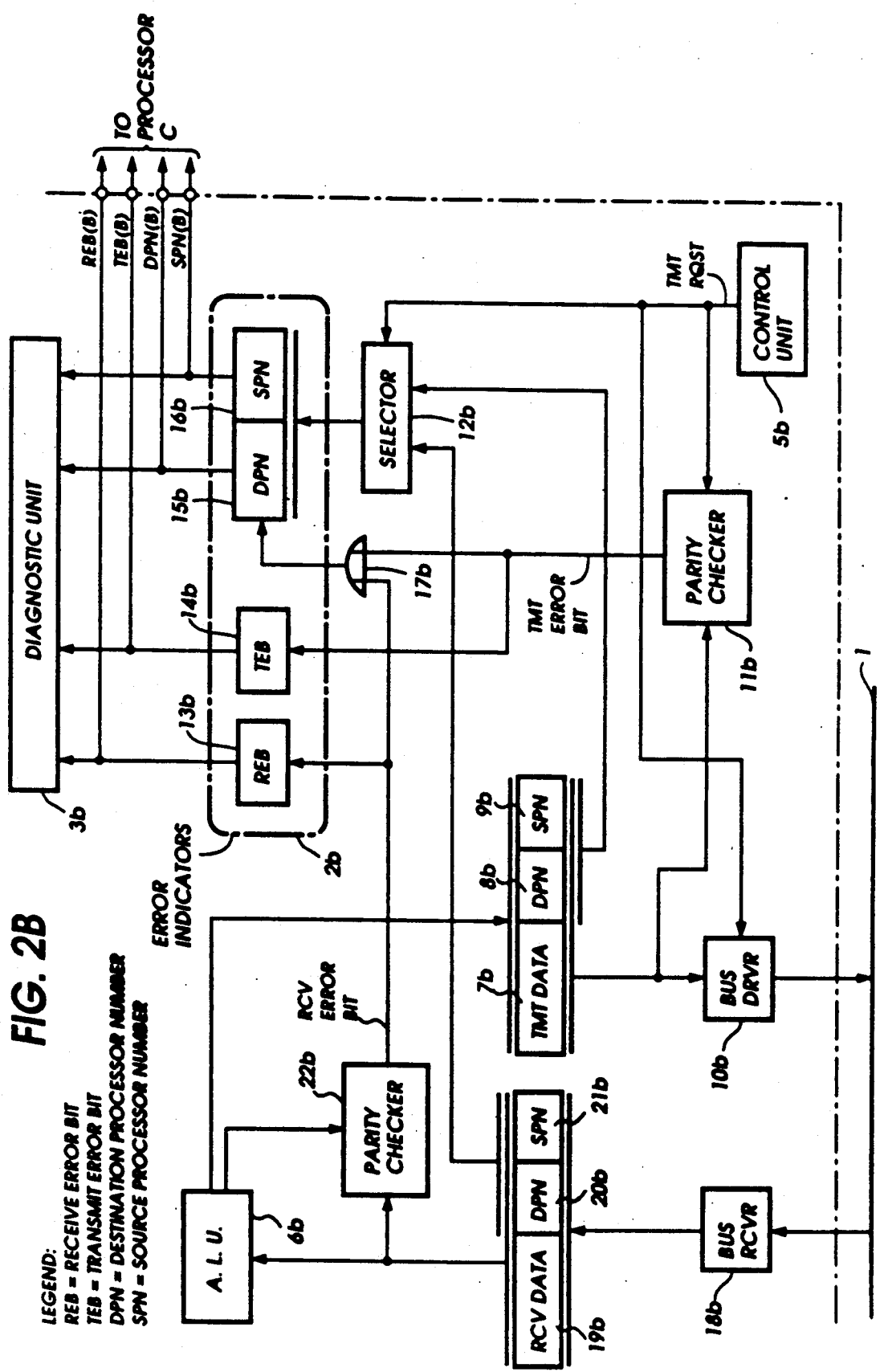

As shown in FIG. 2B, processor B includes error indicating registers 13b, 14b, 15b and 16b for indicating an error in REB, TEB, DPN and SPN data, which are supplied to diagnostic unit 3b as well as to the fault locator 4 of processor C through terminals designated respectively REB(B), TEB(B), DPN(B) and SPN(B).

In FIG. 2C, processor C includes error indicating registers 13c, 14c, 15c and 16c for respectively storing the REB,TEB,DPN and SPN data, which are also supplied to diagnostic unit 3c as well as to the fault locator 4 of this processor through terminals designated respectively REB(C), TEB(C), DPN(C) and SPN(C). The fault locator 4, provided in the processor C, receives the REB(D), TEB(D), DPN(D) and SPN(D) data from processor D and receives the REB(E), TBE(E), DPN(E) and SPN(E) data from processor E.

As illustrated in the flowchart of FIG. 3, the fault locator 4 is programmed to execute instructions described therein. The program execution starts with decision block 30 which determines whether there is an error in transmit or receive data in the processor C by checking the logic states of the REB(C) and TEB(C) bits. If the answer is affirmative, the REB(C) or TEB(C) bit is at logic 1, and control proceeds to decision block 31 which determines whether there is an error in data received by a destination processor specified by the identification stored in the register 15c, i.e., DPN(C). This is achieved by checking whether the one of the REB bits which is identified by DPN(C) is equal to 1 or not, i.e., whether REB(DPN(C))=1. If the answer is negative, processor C is regarded as being in a faulty condition, and if the answer is affirmative in block 31, exit is to decision block 32 which checks whether there is an error in data transmitted from a source processor specified by the identification number stored in the register 16c, i.e., SPN(C). This is achieved by checking whether the one of the TEB bits which is identified by SPN(C) is set equal to 1 or not, i.e., whether TEB(DPN(C))=1. If the answer is affirmative in decision block 32, decision block 33 is executed by checking whether there is an error in data received any other processor. In this test, control determines whether each of the REB bits of the processors other than that specified by DPN(C) is set equal to 1. If the answer is negative in decision block 33, the fault locator 4 determines that the source processor identified by SPN(C) is faulty. If the answer is affirmative in block 33, control proceeds to decision block 34 in which it checks to see if the source processor number of a suspect processor is equal to the source processor number SPN(C). If the answer is negative in block 34, the fault locator determines that the system bus 1 is suspected of being faulty. If the decision in block 34 is affirmative, control determines that the source processor identified by SPN(C) is suspected of being faulty.

If the decision in block 32 is negative, control proceeds to decision block 35 which checks to see if SPN(C) is equal to the identification number of a source processor identified by DPN(C). If the answer is negative, this decision is dismissed and control returns to block 30, and if the answer is affirmative, exit is to block 36 which determines whether there is an error in data received by another processor, namely, whether the REB bit in another processor is set equal to 1. If there is one, control goes to block 34 and if there is none control determines that there is a fault in the transmit section of the source processor or system bus 1.

If the decision in block 30 is negative, exit is to decision block 37 which determines if there is an error in data transmitted from any of the processor A,B,D OR E, namely, if the TEB bit of any of such processors is 1. If the answer is affirmative, control returns to block 30, and if it is negative, control goes to decision block 38 to check to see if there is an error in data received by any of such processors, namely, if the REB bit of such processors is set equal to 1. If the answer is negative, control returns to block 30. If the answer is affirmative, the fault locator decides that the destination processor is suspected of being faulty.

Assume that processor A sends data processor B via the system bus 1, so that the transmitted data is stored into data register 19b and processor identification numbers ID=A and ID=B are respectively stored into identification registors 20b and 21b. The same data and processor identification numbers are received processor C and stored into registers 19c, 20c and 21c, respectively. The operation of the fault locator will be better understood with reference to FIGS. 3 and 4 for a number of exemplary cases.

Case 1: If there is an error in the data being transmitted from processor A, the source processor A is suspected of being faulty, provided that logic 1 is set in the receive error bit registers 13b and 13c, and the source processor number register 16c identifies the processor A. In this case, program control proceeds through blocks 30,31,32, and 33 and negative decision is made in block 33.

Case 2: If there is no error in the data being transmitted from processor A, the destination processor B (specifically, the receive section of processor B) is suspected of being faulty, provided that logic 1 is set in the receive error bit register 13b and no error bit set in the error bit registers of any other processors. In this situation, the program control proceeds through blocks 30 and 37 to block 38 in which affirmative decision is made.

Case 3: If there is an error in the data being received by processor C so that the receive error bit register 13c is set equal to 1, processor C is suspected of being faulty, provided that no error bit is set in any other error bit registers. In this case, the program control proceeds through block 30 to block 31 in which negative decision is made since no error bit is set in the receive error register 13b of processor B which is identified by the register 15c. Case 4: If error bits are set in the receive error bit registers 13b and 13c, the transmit section of source processor A is suspected of being faulty, provided that no error bit is set in the transmit error bit register 14a. In this instance, the program control proceeds through blocks 30,31,32 and 35 to block 36 in which negative decision is made.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A multiprocessor system in which a plurality of processors are connected to a system bus of exchanging data and source and destination processor identification numbers between said processors, wherein each of said processors comprises:
   transmit and receive data registers coupled to said system bus for transmitting to and receiving data from said system bus;
   transmit parity check means coupled to said transmit data register for detecting an error in data being transmitted to said system bus for the transmit data register and receive parity check means coupled to said receive data register for detecting an error in data being received by said received data register from said system bus;
   transmit and receive error bit register means for storing a transmit error bit from said transmit parity check means in response to the detection of said error in said data being transmitted and storing a receive error bit from said receive parity check means in response to the detection of said error in said data being received; and
   source and destination processor number register means for storing the identification numbers of source and destination processors received from said system bus in response to the detection of said error in either of said data,
   wherein said multiprocessor system comprises fault locating means connected to the transmit and receive error bit register means of each of said processors and to the source and destination processor number register means of each of said processors for analyzing the contents of the transmit and receive error bit register means of each of said processors and the contents of the source and destination processor number register means of each of said processors and locating a fault in said system in accordance with the result of said analysis.

2. A multiprocessor system as claimed in claim 1, wherein said fault locating means includes majority decision means for analyzing the contents of the transmit and receive error bit register means of at least three of said processors on the basis of majority decision.

3. A multiprocessor system as claimed in claim 1, wherein said fault locating means determines that there is a faulty condition in said source processor by detecting the presence of said error bit in the transmit error bit register means of the source processor and in the receive error bit register means of said destination processor and a third processor.

4. A multiprocessor system as claimed in claim 3, wherein said fault locating means determines that there is a faulty condition in said destination processor by detecting the presence of said error bit in the receive error bit register means of said destination processor and by detecting the absence of said error bit in the receive error bit register means of said third processor.

5. A multiprocessor system as claimed in claim 3, wherein said fault locating means determines that there is a faulty condition in said third processor by detecting the presence of said error bit in the receive error bit register means of said third processor and by detecting the absence of said error bit in the receive error bit register means of said destination processor.

6. A multiprocessor system as claimed in claim 3, wherein said fault locating means determines that there is a faulty condition in said source processor by detecting the absence of said error bit in the transmit error bit register means of the source processor and detecting the presence of said error bit in the receive error bit register means of said destination processor and said third processor.

7. A multiprocessor system in which at least three processors are connected to a system bus for exchanging data and source and destination processor identification numbers between source and destination processors, wherein the other processor receives the same data and the same source and destination processor identification numbers as those received by said destination processor, wherein each of said processors comprises:
   transmit and receive data registers coupled to said system bus for transmitting to and receiving from said system bus;
   transmit parity check means coupled to said transmit data register for detecting an error in data being transmitted to said system bus from the transmit data register and receive parity check means coupled to said receive data register for detecting an error in data being receive by said receive data register from said system bus;
   transmit and receive error bit register means for storing a transmit error bit from said transmit parity check means in response to the detection of said error in said data being transmitted and storing a receive error bit from said received parity check means in response to the detection of said error in said data being received; and
   source and destination processor number register means for storing the identification numbers of source and destination processors received from said system bus in response to the detection of said error in either of said data,
   wherein said multiprocessor system comprises fault locating means connected to the transmit and receive error bit register means of each of said processors and to the source and destination processor number register means of each of said processors for analyzing the contents of the transmit and receive error bit register means of each of said processors and the contents of the source and destination processor number register means of each of said processors, and locating a fault in said system in accordance with the result of said analysis.

8. A multiprocessor system as claimed in claim 7, wherein said fault locating means includes majority decision means for analyzing the contents of the transmit and receive error bit register means of each of said processors on the basis of majority decision.

* * * * *